United States Patent [19]

Carroll et al.

[11] Patent Number: 4,563,909
[45] Date of Patent: Jan. 14, 1986

[54] SYSTEM FOR ELECTRONICALLY TUNING AND SUPPRESSING 2N RECTIFICATION TORQUES IN A DYNAMICALLY TUNED FREE ROTOR GYROSCOPE

[75] Inventors: Raymond Carroll, Andover; Byong-Ho Ahn, Wayland, both of Mass.

[73] Assignee: The Charles Stark Draper Laboratory, Inc., Cambridge, Mass.

[21] Appl. No.: 394,720

[22] Filed: Jul. 2, 1982

[51] Int. Cl.$^4$ .................. G01C 19/28; G01C 19/30
[52] U.S. Cl. ........................... 74/5.5; 74/5.46; 74/5.6 R
[58] Field of Search ............ 74/5.4, 5.5, 5 F, 5.46, 74/5.6 R, 5.6 D

[56] References Cited

U.S. PATENT DOCUMENTS

| | | | |
|---|---|---|---|
| 3,082,631 | 3/1963 | Bishop | 74/5.4 X |
| 3,264,880 | 8/1966 | Fischel | 74/5 F |
| 3,483,760 | 12/1969 | Hurlburt | 74/5 F |
| 3,534,616 | 10/1970 | O'Connor | 74/5 F |
| 3,538,776 | 11/1970 | Macor et al. | 74/5 F |
| 3,575,475 | 4/1971 | Boerner | 74/5 F X |
| 3,585,866 | 6/1971 | Ensinger | 74/5 F |
| 3,597,938 | 8/1971 | Hellen et al. | 308/2 A X |
| 3,614,894 | 10/1971 | Ensinger | 74/5 F X |
| 3,678,764 | 7/1972 | Erdley et al. | 74/5 F |
| 3,700,289 | 10/1972 | Bilinski | 74/5 F X |
| 3,700,290 | 10/1972 | Ensinger | 74/5 F X |
| 3,709,045 | 1/1973 | Krupick et al. | 74/5.4 X |
| 3,722,296 | 3/1973 | Hurlburt et al. | 74/5 F |
| 3,748,912 | 7/1973 | Hildebrand | 74/5 F |
| 3,805,625 | 4/1974 | Schlitt | 74/5.4 X |
| 3,856,366 | 12/1974 | Weisbord et al. | 74/5 F X |
| 3,943,778 | 3/1976 | Wyse | 74/5 F |
| 4,002,078 | 1/1977 | Thomas | 74/5 F X |
| 4,062,600 | 12/1977 | Wyse | 74/5 F X |
| 4,100,813 | 7/1978 | Previte | 74/5 F |
| 4,114,402 | 9/1978 | Craig et al. | 74/5 F X |
| 4,143,451 | 3/1979 | Craig et al. | 29/434 |
| 4,395,922 | 8/1983 | Bowditch et al. | 74/5 F X |

OTHER PUBLICATIONS

E. W. Howe, et al., "The Dynamically Tuned Free Rotor Gyro", Control Engineering, Jun. 1964, pp. 67, 72.

R. J. B. Craig, "Theory of Errors in a Multi-Gimbal Elastically Supported, Tuned Gyroscope", IEEE Transactions on Aerospace and Electronic Systems, vol. AES8, No. 3, May 1972, pp. 289–297.

*Primary Examiner*—Rodney H. Bonck
*Attorney, Agent, or Firm*—Lahive & Cockfield

[57] ABSTRACT

A system for electronically tuning and suppressing 2N rectification torques in a dynamically tuned free rotor gyroscope with a universal hinge, or a plurality of universal hinges. The system includes means to adjust the frequency of the drive shaft of the gyroscope to a speed such that the rotor precession due to direct elastic restraint torques is eliminated. In addition, the system includes means for measuring the two degree of freedom angular deviations of the principal axis of the rotor with respect to the gyroscope case, as well as the angular deviations of the shaft spin axis relative to the gyroscope case. The sensed angular deviations of both the rotor and shaft drive a torque generator which produces a torque on the rotor for nulling torque due to angular vibrations of the drive shaft with respect to the rotor. The controlled phasing and gain of the nulling torque provides both average bending compliance tuning and suppression of the 2N rectification.

5 Claims, 7 Drawing Figures

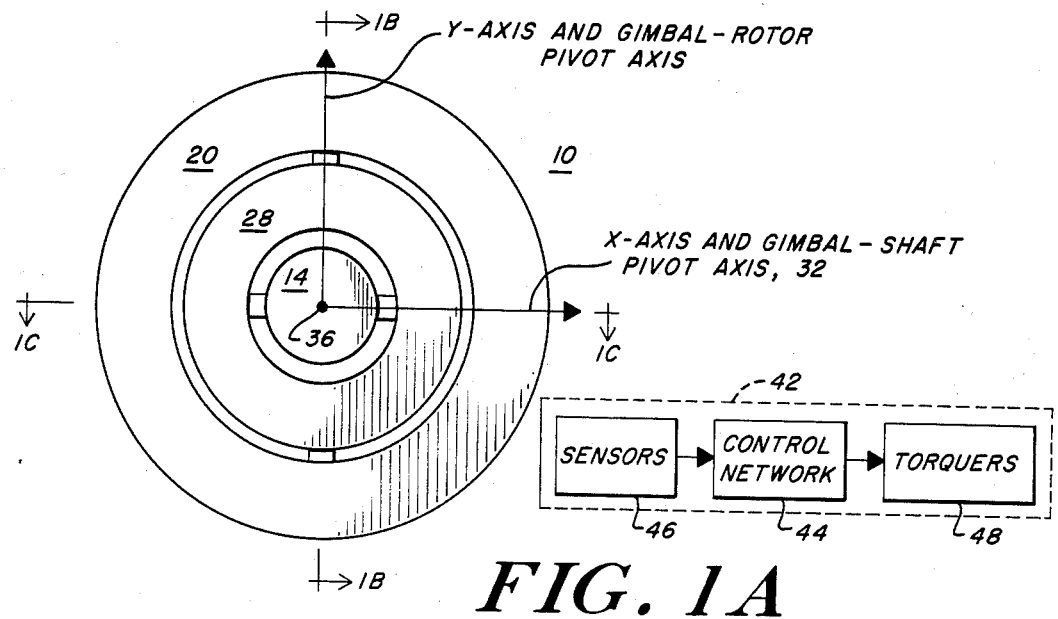
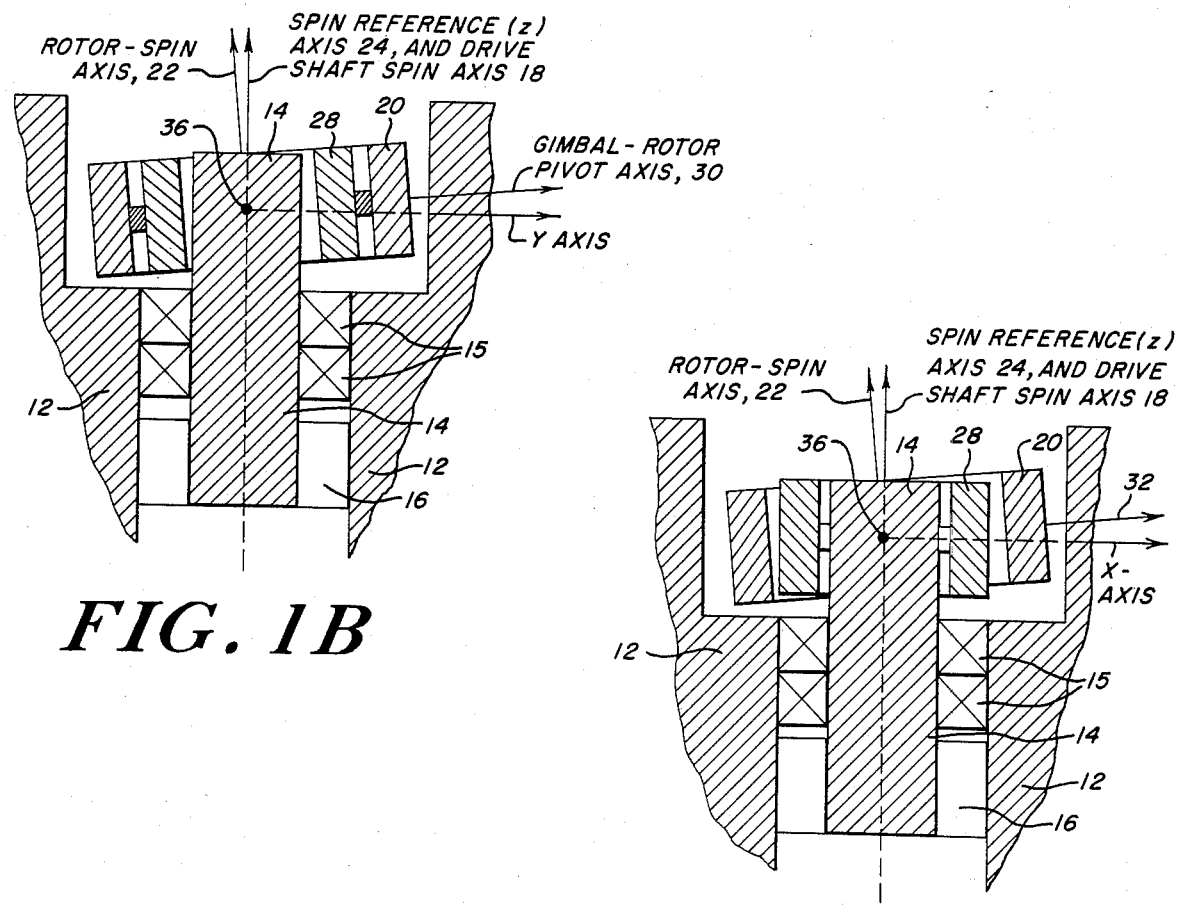
FIG. 1A
FIG. 1B
FIG. 1C

SYSTEM FOR ELECTRONICALLY TUNING AND SUPPRESSING 2N RECTIFICATION TORQUES IN A DYNAMICALLY TUNED FREE ROTOR GYROSCOPE

BACKGROUND OF THE INVENTION

This invention relates to gyroscopes, and more particularly to dynamically tuned free rotor gyroscopes.

A dynamically tuned free rotor gyroscope, or gyro, includes a case, a drive shaft and associated motor for rotating the drive shaft on a set of bearings with respect to the case about a drive shaft spin axis, and a hinge supported rotor adapted for rotation about a rotor spin axis. Classically, the rotor is attached to the drive shaft by way of a universal hinge having a single gimbal element with elastic bending or torsion pivot elements. The gimbal is pivoted about two mutually orthogonal axes that intersect at a pivot point coincident with both the rotor spin axis and the drive shaft spin axis. The gimbal is attached to a rotor along one pivot axis called the gimbal-rotor pivot axis. The drive shaft is attached to the gimbal along the orthogonal pivot axis called the gimbal-shaft axis. The gimbal-rotor pivot axis is orthogonal to the rotor spin axis and the gimbal shaft-pivot axis is orthogonal to the shaft spin axis.

In operation, as the motor drives the drive shaft, and thus also the rotor, the rotor precesses due to torques that are proportional to the angular deviation of the rotor spin axis from a force-free equilibrium position aligned with the rotor drive shaft axis. These torques are either directly proportional to the above-mentioned angular deviation, or are proportional to the mentioned angular deviation modulated sinusoidally at two-times spin speed. These torques are herein referred to as direct elastic restraint torques, and as anisoelastic restraint torques, respectively. Generally the torques are produced by the bending of the elastic suspension pivots and the spinning, oscillating gimbal.

With this configuration, there is a shaft spin speed called the tuned speed at which the gyroscope rotor precession due to the sum of the direct elastic restraint torques vanishes. At this tuned speed, for small angular deviations, the direct elastic restraint torques acting on the rotor (which are due to elastic pivots and other in-phase means) are cancelled by inertial torques caused by the dynamics of the constrained spinning, oscillating gimbal. See E. W. Howe and P. H. Savet, "The dynamically tuned free rotor gyro," control engineering, PP. 67-72, June 1964.

In the prior art, the dynamic tuning by spin speed adjustment may be augmented by the following methods:

(a) adjusting the bending or torsional stiffness of the pivots,
(b) adjusting the mass distribution of the gimbal along the axis perpendicular to the plane of the orthogonal pivot axes,
(c) adjusting the spin speed of the drive shaft,
(d) applying a feedback torque proportional to the rotor hang-off angle.

However, once a gyroscope is fabricated and assembled, only the spin speed adjustment and feedback torque methods are readily available for tuning the rotor precession.

It is well known in the prior art that a gyro having a hinge with a single gimbal is susceptible to errors produced by shaft angular motion near twice the spin frequency. See, for example, R. J. B. Craig, "Theory of Errors in a Multi-Gimbal Elastically Supported, Tuned Gyroscope," IEEE Transactions on Aerospace and Electronic Systems, Vol. AES-8, No. 3, pp. 289-297, May, 1972, and U.S. Pat. No. 3,678,764. Typically, these anisoelastic effects are less than 0.1 Newtonmeter per radian of shaft angular vibration referenced to the rotor spin axis. Shaft angular vibrations may be caused by bearing inhomogenieties, or by vibrations of the gyroscope housing, or case, transmitted to the shaft. In a relatively quiet dynamic environments, the bearing angular motions may be relatively uniform over a short span of time. In this case, the average error torques transmitted to the rotor may be nearly constant and thus appear as a fixed error torque that can be calibrated and compensated. However, changes in the steady state bearing second harmonic angular motion appears as a bias change in the error torque experienced by the rotor. Furthermore, in dynamic environments, a shaft angular motion may change substantially, giving rise to changing error torques transmitted to the rotor.

In the prior art, these transmitted error torques are nulled by using a plurality of gimbals in the universal hinge. These gimbals and their pivot axes are arranged in such a manner that a cancellation of errors produced by the shaft angular motion at twice spin frequency occurs. This cancellation may be achieved by methods of either:

(a) adjusting the relative bending or torsional stiffness of the pivots, or
(b) adjusting the relative mass distribution, of the gimbals along the axis perpendicular to the plane of the pivot axes.

However, once a prior art gyroscope is fabricated and assembled, it is prohibitively difficult to adjust the pivot stiffness or gimbal mass distribution. Consequently, in the prior art, these anisoelastic restraint adjustments must be made before assembly or those adjustments must be ignored altogether.

In the prior art, gyroscopes typically utilize a plurality of universal hinge elements with mechanical means for adjusting gimbal mass distribution on the spin axis, or alternatively utilize exceptional care in machine tolerancing the pivot dimensions. The absolute pivot dimension must typically be within a fraction of $10^{-6}$ meter in order that the pivot stiffness be within a percent of a nominal value. Where parallel gimbals are used, for example, as in U.S. Pat. Nos. 3,678,764 and 4,143,451, extreme care must be taken to align the pivot axis of one gimbal with respect to another so that misaligned pivots will not contribute to excessive stiffness of the combined pivot joints. The precision balancing and adjustment procedures are expensive and must be done before assembly of the gyroscope. Furthermore, after assembly, no further tuning or matching of mechanical parameters is possible). For these reasons, in the prior art, it is not possible to either fine tune the direct elastic restraint torques or to match the anisoelastic restraint torques after gyroscope assembly.

There are also other sources of elastic restraint, such as viscous drag on the rotor, signal generator field energy, motor winding fields, and others that cannot properly be tuned before assembly. Furthermore, with the aging of the gyroscope, the effective elastic restraint changes so that the free rotor behavior is often degraded with time. In addition, bearings have to be carefully selected for homogeniety to minimize shaft vibration. Typically this vibration cannot be controlled through dynamic environments and with natural aging.

The error mechanisms that particularly plague dynamically tuned free rotor gyroscopes are those error torques that are proportional to the bending of the hinge flexures from a position aligned by very careful, accurate and precise matching, balancing and assembly of the hinge suspension.

Generally, this error mechanism is addressed by "matching" flexure bending compliance with gimbal inertias. This is accomplished by careful prematching of flexure dimensions or by adjusting gimbal axis mass moments. The disadvantage of such gimbal adjustment scheme, is that flexures must be machined to a width tolerance of about five percent to bring compliance within bounds that enable tuning by adjustment of gimbal weights. However, to attain hinge rigidity with respect to linear vibrations, it is necessary to have short flexure blades. This in turn demands thin flexure blades to obtain low bending compliance. Therefore a five percent flexure width tolerance typically implies about one micrometer tolerance on flexure absolute width machining. This tolerance is achievable only with expensive and time consuming machining. If no gimbal inertia adjustment is used, flexure width tolerances become more stringent, usually to less than 0.1 micrometer. This is only achievable by combination of lapping and careful measuring of bending compliance.

Accordingly, it is an object of the present invention to provide a system for tuning a gyroscope having a universal hinge, or a plurality of universal hinges, by electromechanical means.

It is another object to provide an electromechanical system for suppressing 2N rectification torques in a free rotor gyroscope.

SUMMARY OF THE INVENTION

The present invention provides a system for electronically tuning and suppressing 2N rectification torques in a dynamically tuned free rotor gyroscope with a universal hinge, or a plurality of universal hinges. The system providing this tuning and suppression is operable after gyroscope assembly and sealing. Generally, the frequency of the drive shaft of the gyroscope is to be adjustable to a speed such that the rotor precession due to direct elastic restraint torques is controlled to vanish. The two degree of freedom angular deviations of the principal axis of the rotor with respect to the gyroscope case are measured, as well as the angular deviations of the shaft spin axis relative to the gyroscope case. The sensed angular deviations of both the rotor and shaft are used to drive a torque generator which produces a torque on the rotor for nulling torque due to angular vibrations of the drive shaft with respect to the rotor.

In one form of the invention, the angular deviations of the rotor are measured with respect to the gimbal, the angular deviations of the shaft are measured with respect to the gimbal, and the sensed deviations are used to null error torques due to the gimbal angular deviations with respect to both the rotor and the drive shaft.

In another form, the angular deviations of both the shaft and rotor are measured with respect to the case. The resultant sensed deviation signals are modulated by the rotation matrix relating shaft-fixed coordinates to case-fixed coordinates. The rotor is then torqued in proportion to the displacements about the pivot axes to individually compensate for the respective bending compliances of the pivot elements, thereby nulling the error torques.

In all these configurations, the speed of the spin motor is controlled by closed loop feedback such that the motor is synchronized with a stable clock and oscillations in spin speed about the average spin speed are rapidly damped. Moreover, the hinge member is rigid and isocompliant with respect to linear accelerations of the gyroscope case.

In accordance with the present invention, a system controls the average bending compliance and suppresses 2N rectification by a combination of ad3usting gyroscope spin.frequency and electromechanically applying a nulling torque to the rotor proportional to the bending of both the hinge pivots. With the controlled phasing and gain of the torque, both average bending compliance tuning and suppression of the 2N rectification is achieved.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1A shows an exemplary gyroscope system embodying the present invention, including a top view of a dynamically tuned free rotor gyro;

FIG. 1B shows a sectional view of the gyro of FIG. 1A along lines 1B—1B;

FIG. 1C shows a sectional view of the gyro of FIG. 1A along lines 1C—1C; and

DESCRIPTION OF THE PREFERRED EMBODIMENT

Figure 2:
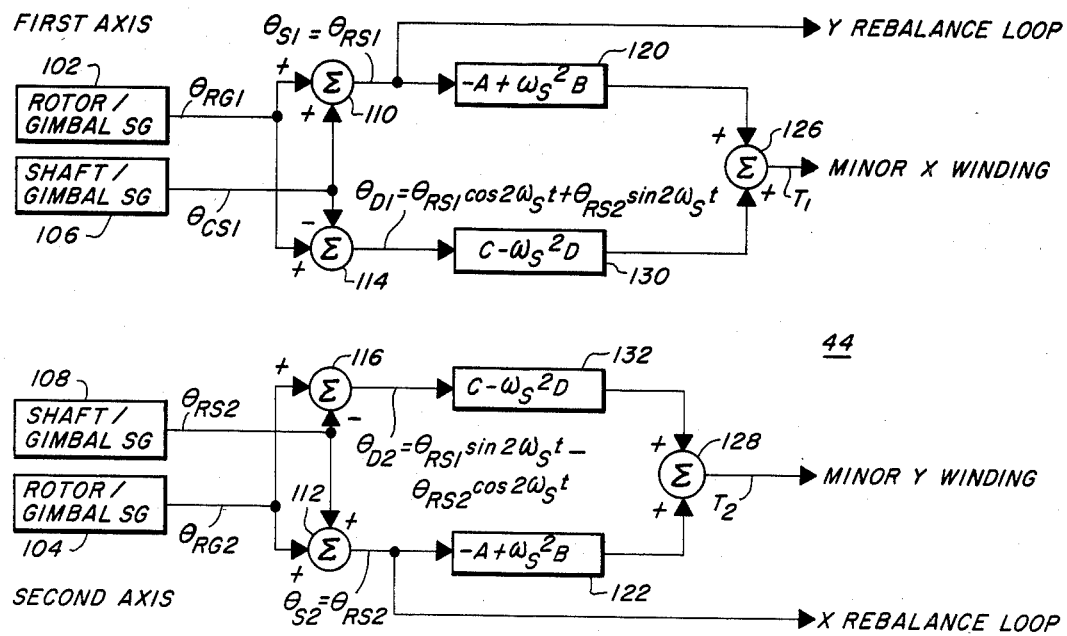
FIGS. 2–5 show in block diagram form, exemplary control networks for the system of FIG. 1A.

FIG. 1 shows an exemplary free rotor gyroscope (gyro) system 10 in accordance with the present invention. Gyro system 10 includes a case 12, a drive shaft 14, a set of bearings 15 and associated motor 16 for rotating the drive shaft 14 about a drive shaft spin axis 18, and a rotor 20 adapted for rotation about a rotor spin axis 22, which is nominally parallel to a spin reference (Z) axis 24 which is fixed to case 12. The rotor 20 is attached to the drive shaft 14 by way of a gimbal 28 including two sets of pivot (or hinge) elements. Gimbal 28 is elastically pivoted about two mutually orthogonal axes (gimbal-rotor pivot axis 30 and gimbal-shaft pivot axis 32) that intersect a pivot point 36 coincident with the rotor spin axis 22 and the drive shaft spin axis 18. Axis 32 is orthogonal to axis 18 and axis 30 is orthogonal to axis 22. A controller 42 includes a control network 44, which is coupled by way of sensors 46 and torquers 48 to various elements of the rotor-gimbal-shaft-case configuration.

Generally, the torquers 48 may include conventional-type devices affixed to case 12. The torquers 48 are adapted to apply torque to the rotor about X and Y axes which are orthogonal to the spin reference axis 24. The sensors 46 may include conventional signal generators (SG's) which generate signals representative of the angular displacement of one element with respect to another. In the various forms of this invention, the signal generators may detect two degree of freedom (2DOF) angular displacement of the rotor about the X and Y axes with respect to the case (i.e. $\bar{\theta}_{RC}$, the rotor-to-case displacement) or the 2DOF angular displacement of the rotor spin axis with respect to the gimbal axis (i.e. $\bar{\theta}_{RG}$, the rotor-to-gimbal displacement) or the 2DOF angular displacement of the gimbal axis with respect to the drive shaft axis (i.e. $\bar{\theta}_{GS}$, the gimbal-to-shaft displacement).

With this general gyro system configuration, error torques transmitted to the rotor through the hinge are due primarily to shaft angular vibration over a broad frequency range with respect to the rotor. The elastic restraint torques depend on the shaft-to-rotor angular deviation vector (i.e. $\bar{\theta}_{RS}$, the rotor-to-shaft displacement) in the following way:

$$\begin{pmatrix} \epsilon M_1 \\ \epsilon M_2 \end{pmatrix} = (A - w_s^2 B) \begin{pmatrix} \theta_{RS1} \\ \theta_{RS2} \end{pmatrix} +$$

$$(C - w_s^2 D) \begin{pmatrix} \cos 2w_s t & \sin 2w_s t \\ \sin 2w_s t & -\cos 2w_s t \end{pmatrix} \begin{pmatrix} \theta_{RS1} \\ \theta_{RS2} \end{pmatrix}$$

These vector components are in case-fixed coordinates where $\epsilon M_1$ and $\epsilon M_2$ are error torques, $w_s$ is shaft spin speed and A, B, C, & D are constants.

FIG. 2 shows an exemplary form for controller 42 (including sensors 46 and control network 44) which controls these elastic restraint torques to be exactly cancelled. The controller 42 of FIG. 2 includes rotor/gimbal signal generators 102 and 104 and shaft/gimbal signal generators 106 and 108 for two orthogonal axes in the gimbal frame of reference. The angle signals for each of those orthogonal axes are summed in network 44 in a respective one of summing networks 110 and 112 to produce sum signals $\theta_{S1}$ and $\theta_{S2}$. The signal generator signals are also applied to summing networks 114 and 116 to provide difference signals $\theta_{D1}$ and $\theta_{D2}$ for the respective ones of the orthogonal axes. The sum signals are each applied to a weighting network having a gain equal to (one of weighting networks 120 and 122), each having a gain equal to $(-A + w_s^2 B)$. The output signals from networks 120 and 122 are applied to the first input of a respective one of summing networks 126 and 128.

The difference signals from networks 114 and 116 are each applied to a respective one of weighting networks 130 and 132, each having a gain equal to $(C - w_s^2 D)$. The output signals from networks 130 and 132 are applied to the respective ones of summing networks 126 and 128. Networks 126 and 128 provide output signals T1 and T2, respectively, which signals are in turn applied to minor windings on a torquer which is adapted to apply torque in response to those signals about the X and Y axes, respectively (to the rotor).

With that configuration, the rotor-to-gimbal angular deviation $\theta_{RG}$ and gimbal-to-shaft angular deviation $\theta_{GS}$ are measured. For any rotor-to-case hangoff angle, these two vector quantities are each oscillating at twice spin speed. Furthermore, both have identical DC components and the 2N components are 180° out of phase. In particular, summing and differencing these signals gives $$\begin{pmatrix} \theta_{RG1} + \theta_{GS1} \\ \theta_{RG2} + \theta_{GS2} \end{pmatrix} = \begin{pmatrix} \theta_{RS1} \\ \theta_{RS2} \end{pmatrix}$$

$$\begin{pmatrix} \theta_{RG1} \theta_{GS1} \\ \theta_{RG2} \theta_{GS2} \end{pmatrix} = \begin{pmatrix} \cos 2w_s t & -\sin 2w_s t \\ \sin 2w_s t & \cos 2w_s t \end{pmatrix} \cdot \begin{pmatrix} \theta_{RS1} \\ \theta_{RS2} \end{pmatrix}$$

It is apparent from the above error torque expression that the error torques are exactly cancelled if the rotor is electromechanically torqued according to $$\delta \bar{M} = -(A - w_s^2 B)(\bar{\theta}_{RG} + \bar{\theta}_{GS}) + (C - w_s^2 D)(\bar{\theta}_{RG} - \bar{\theta}_{GS})$$

In the configuration of FIG. 2, there are no demodulation electronics. Furthermore, the summed $\theta S1$ and $\theta S2$ signals are part of the standard torque rebalance loop. The $(-A + w_s^2 B)$ weighting network may be eliminated from the system 10 when the tuned speed is chosen so that $$A = w_s^2 B \text{ or } w_s = \sqrt{A/B}$$

In that case, the summing blocks 126 and 128 are not used.

Figure 3:
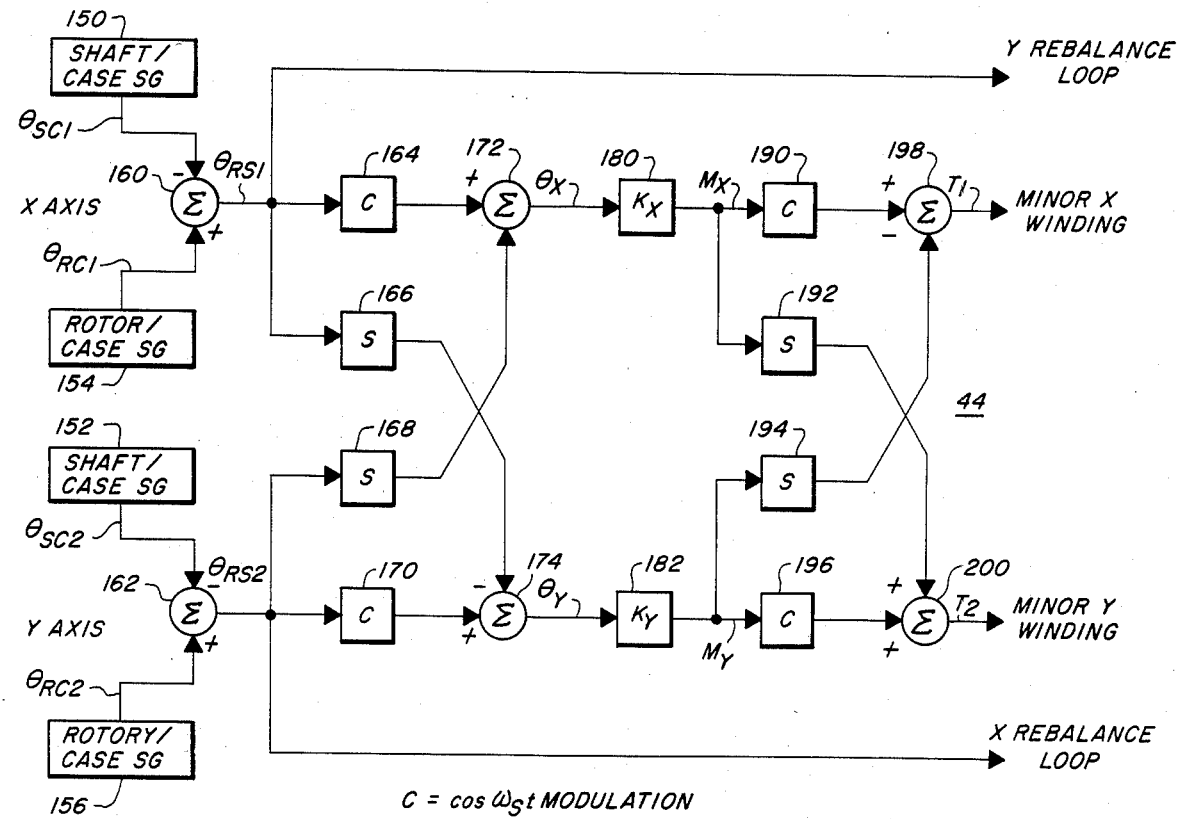

FIG. 3 shows another embodiment of the control network 44 of the present invention. In FIG. 3, shaft/case signal generators 150 and 152 generate signals ($\theta_{SC1}$ and $\theta_{SC2}$) which are representative of the angular displacement of the drive shaft axis about the respective case fixed X and Y axes. Rotor/case signal generators 154 and 156 generate signals ($\theta_{RC1}$ and $\theta_{RC2}$) which are representative of the angular displacement of the rotor spin axis about the respective case fixed X and Y axes.

Difference networks 160 and 162 are responsive to the shaft/case and rotor/case signal generators to generate signals representative of the angular displacement of the rotor axis with respect to the shaft axis ($\theta_{RS1}$ and $\theta_{RS2}$, respectively). These signals are each modulated by $\cos w_s t$ and $\sin w_s t$. The resultant modulated signals are applied to sum and difference networks 172 and 174 (by multiplier networks 164, 166, 168 and 170).

The output signals $\theta_X$ and $\theta_Y$ from networks 172 and 174, respectively, are applied to weighting networks 180 and 182 are modulated by $\cos w_s t$ and $\sin w_s t$ in multiplier networks 190, 192, 194 and 196. The outputs of these multiplier networks are applied to difference and sum networks 198 and 200, respectively to generate torquer drive signals $T_1$ and $T_2$, respectively.

In this form, the shaft angular deviation with respect to the gyroscope case is measured. It is understood that rotor deviation with respect to case is also measured. The vector difference of these deviation angles is the shaft to rotor angular deviation vector $\theta_{RS}$. This angle contains information about flexure bending, but in a form modulated by the rotation matrix connecting rotor fixed coordinates to case fixed coordinates.

Generally, the rotor is controlled to spin at a rate $w_s$. As a result, the individual pivot axes of the hinge are bending according to $$\theta_x = \theta_{RS1} \cos w_s t + \theta_{RS2} \sin w_s t$$

$$\theta_y = \theta_{RS1} \sin w_s t + \theta_{RS2} \cos w_s t$$

where $\theta x$ and $\theta y$ are bending angles of the x' and y' axis pivots (about axes 30 and 32, respectively). $\theta_{RS1}$ and $\theta_{RS2}$ are angles measured by the case-fixed signal generators. The elastic restraint restoring torques exerted on the rotor by the pivots are represented by $$M_x = K_x \theta_x \text{ and } M_y = K_y \theta_y$$

In this embodiment, torques proportional to measured $\theta x$ and $\theta y$ are applied about the rotor $x'$ and $y'$ pivot axes and have the effect of changing the bending compliance about the $x'$ and $y'$ axis pivots individually. In this embodiment, the spin speed and the proportionality constants are chosen so that the previously mentioned constants $$A - w_s^2B \text{ and } C - w_s^2D$$

are substantially nulled. In particular, the applied proportional torques are represented by effective stiffness $k_x$ and $k_y$ about the rotor $x'$ and $y'$ pivot axes, respectively. The hinge is tuned by spin speed adjustment (i.e. so that $w_s = \sqrt{A/B}$) and both $k_x$ and $k_y$ are adjusted so as to give both axes equal bending elastic restraint. In that condition, the sum $k_x + k_y$ is zero. These constants are readily determined by using the torque generator to excite the rotor such that the precession modes, due to the tuning term and 2N rectification term may be measured independently. The constants $k_x$ and $k_y$ may be positive or negative. The compensating torque applied to the rotor with components $$k_x \theta_x \text{ and } k_y \theta_y$$

in the rotor fixed coordinates appears in case-fixed coordinates to be a rotating torque vector orthogonal to the rotor spin axis. The magnitude of this spinning torque is such that it removes the bending anisoelasticity of the hinge flexures and establishes the average effective bending compliance so that the 2N rectification is suppressed and the gyro is tuned at a nominal frequency. Slight fine tuning adjustments may be made by adjusting the spin frequency so that the rotor is free to tilt from the nominal spin axis without experiencing elastic torques.

In this configuration too, it should be noted that the tuning and 2N rectification suppression occurs after the gyroscope is assembled. Therefore, this process is adaptive and may be recalibrated from time to time as gyro physical parameters change. Furthermore, this adjustment process occurs in the hinge operating condition, not in isolation from other gyroscope mechanisms that contribute to rotor elastic restraint.

Figure 4:
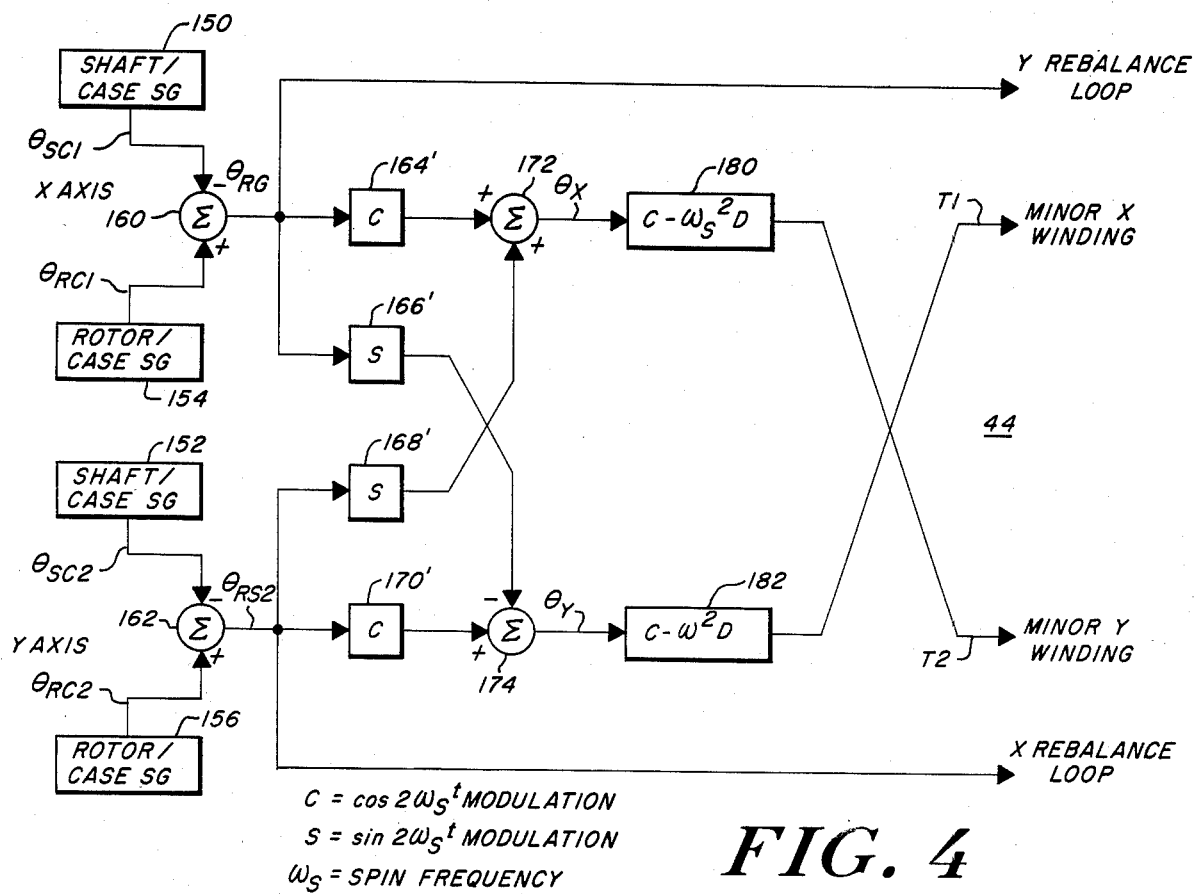
Figure 5:
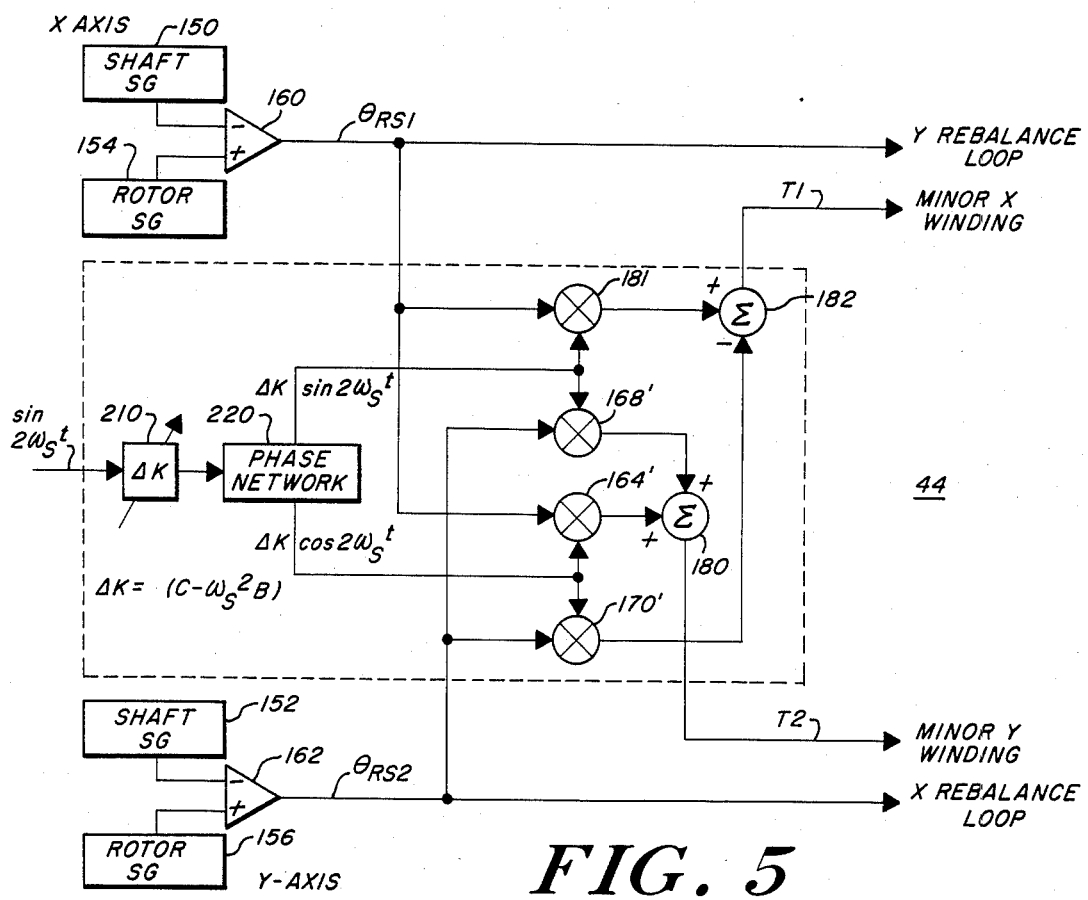

FIGS. 4 and 5 show yet other forms of the control network 44 of the present invention. The input section of the controller 44 of FIG. 4 is substantially the same as that with the configuration of FIG. 3 and the corresponding blocks are identified in FIG. 4 with identical reference designations. However, it should be noted that the multiplier networks 164, 166, 168 and 170 denoted in FIG. 4 with "primes" to indicate that the modulations performed are with respect to $2w_s$ and the scaling networks 180 and 182 are characterized by gain functions proportional to $(C-w_s^2D)$. The output signals from blocks 182 and 180 correspond directly to torquer signals T1 and T2, respectively.

FIG. 5 shows a configuration which is another representation of that in FIG. 4. In this configuration, the scaling, or weighting, networks 180 and 182 are replaced by gain network 210. In FIG. 5, the multiplier blocks are shown explicitly together with the modulating signals, as scaled by block 210 and generated in quadrature by the phase network 220. In the configuration of FIG. 4, the $\bar{\theta}_{RS}$ may be measured as described above in conjunction with the embodiment of FIG. 3. The quantities $$A - w_s^2B \text{ and } C - w_s^2D$$

may be measured independently. In this embodiment, $w_s$ is physically chosen such that $A - w_s^2B = 0$. The measured angle signal $\bar{\theta}_{RS}$ is modulated electronically by the matrix $$\begin{pmatrix} \cos 2w_st & \sin 2w_st \\ \sin 2w_st & -\cos 2w_st \end{pmatrix}$$

The resulting vector quantity is scaled by a gain equal to $-C+w_s^2D$. The resulting scaled vector signals (T1 and T2) are applied to the respective X and Y axis torquers in order to torque the rotor. The resultant torque vector suppresses the 2N rectification errors transmitted to the rotor through the flexures from the shaft. The configuration of FIG. 5 is substantially the same as that of FIG. 4, except that the $C-w_s^2D$ scaling is performed prior to the modulation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for suppressing 2N rectification torques in a free rotor gyroscope, said gyroscope including
   a case,
   a drive shaft and associated means for rotating and supporting said drive shaft with respect to said case at an angular rate $w_s$ about a drive shaft spin axis,
   a rotor adapted for rotation about a rotor spin axis, and
   a gimbal coupling said rotor and drive shaft, said gimbal including first pivot means for elastically coupling said drive shaft to said gimbal about a gimbal-shaft pivot axis orthogonal to and intersecting said drive shaft spin axis, and including a second pivot means for elastically coupling said rotor to said gimbal about a gimbal-rotor pivot axis orthogonal to and intersecting said rotor spin axis and said gimbal shaft pivot axis, comprising:
   means for adjusting said angular rate $w_s$ whereby direct elastic restraint torques are nulled, and means for applying a nulling torque to said rotor proportional to the bending of said first and second pivot means about the respective ones of said pivot axes, whereby elastic restraint torques due to angular vibrations of said drive shaft with respect to said rotor are substantially cancelled.

2. A system according to claim 1 wherein said adjusting means and said torquing means comprise:
   A. first signal generator including means for generating first signals ($\theta_{RG1}$ and $\theta_{RG2}$) representative of the relative angular displacement vector of said rotor with respect to said gimbal about said gimbal-rotor pivot axis,
   B. second signal generator including means for generating second signals ($\theta_{GS1}$ and $\theta_{GS2}$) representative of the relative angular displacement vector of said drive shaft with respect to said gimbal about said gimbal-shaft pivot axis, C. sum signal generator including means for generating sum signals ($\theta_{S1}$ and $\theta_{S2}$) representative of the vector sum of said first and second signals, D. difference signal generator including means for generating difference signals $\theta_{D1}$ and $\theta_{D2}$) representative of the vector difference of said first and second signals, E. first weighting network including means for scaling said sum signals by a factor $(-A+w_s^2B)$, where A and B are predetermined constants, F. second weighting network including means for scaling said difference signals by a factor $(+C-w_s^2D)$, where C and D are predetermined constants, G. torque signal generator including means for generating torque signals (T) representative of the sum of said scaled sum and difference signals, H. torquer including means responsive to said torque signals to torque said rotor with respect to said case.

3. A system according to claim 2 where $w_s=\sqrt{A/B}$.

4. A system according to claim 1, wherein said adjusting means and said torquing means comprise:

A. first signal generator including means for generating first signals ($\theta_{SC1}$ and $\theta_{SC2}$) representative of the relative displacement of said shaft with respect to each of a first axis and a second axis, said first and second axes being orthogonal and being fixed with respect to said case, B. second signal generator including means for generating second signals ($\theta_{RC1}$ and $\theta_{RC2}$) representative of the relative displacement of said rotor with respect to each of said first and second axes, C. first difference signal generator responsive to said first and second signals and including means for generating first difference signals ($\theta_{RS1}$ and $\theta_{RS2}$) representative of the differences of the respective ones of said first and second signals for each of said first and second axes, D. first multiplier responsive to said first difference signals and including means for generating first and second sine modulated signals ($\theta_{RS1}$ sin $w_st$ and $\theta_{RS2}$ sin$w_st$, respectively) and first and second cosine modulated signals ($\theta_{RS1}$ cos $w_st$ and $\theta_{RS2}$ cos $w_st$, respectively), E. first combiner network responsive to said first and second modulated signals and including means for generating first and second pivot signals, said first pivot signal ($\theta_x$) being representative of the sum of said first cosine modulated signal and said second sine modulated signal and said second pivot signal ($\theta_y$) being representative of the difference of said second cosine modulated signal and said first sine modulated signal, F. weighting network responsive to said pivot signals and including means for generating first and second weighted signals, said first weighted signal ($M_x$) being representative of $k_x\theta_x$ and said second weighted signal ($M_x$) being representative of $k_y\theta_y$, where $k_x+k_y=0$, G. second multiplier responsive to said weighted signals and including means for generating third and fourth sine modulated signals ($M_x$sin $w_st$ and $M_y$sin $w_st$, respectively) and third and fourth cosine modulated signals ($M_x$cos $w_st$ and $M_y$cos $w_st$, respectively, H. second combiner network responsive to said third and fourth modulated signals and including means for generating first and second torquer signals, said first torquer signal ($T_x$) being representative of the difference of said third cosine modulated signal and said fourth sine modulated signal and said second torquer signal ($T_y$) being representative of the sum of said second cosine modulated signal and said first sine modulated signal, I. first torquer responsive to said first torquer signal and including means for applying a torque to said rotor about said first axis, and J. second torquer responsive to said second torquer signal and including means for applying a torque to said rotor about said second axis.

5. A system according to claim 1, wherein $w_s=\sqrt{A/B}$ where A and B are predetermined constants and said adjusting means and said torquing means comprise:

A. first signal generator including means for generating first signals ($\theta_{SC1}$ and $\theta_{SC2}$) representative of the relative displacement of said shaft with respect to each of a first axis and a second axis, said first and second axes being orthogonal and being fixed with respect to said case, B. second signal generator including means for generating second signals ($\theta_{RC1}$ and $\theta_{RC2}$) representative of the relative displacement of said rotor with respect to each of said first and second axes, C. first difference signal generator responsive to said first and second signals and including means for generating first difference signals ($\theta_{RS1}$ and $\theta_{RS2}$) representative of the differences of the respective ones of said first and second signals for each of said first and second axes, D. first multiplier responsive to said first difference signals and including means for generating first and second sine 2N modulated signals ($\theta_{RS1}$ sin $2w_st$ and $\theta_{RS2}$ sin $2w_st$, respectively) and first and second cosine 2N modulated signals ($\theta_{RS1}$ cos $2w_st$ and $\theta_{RS2}$ cos $2w_st$, respectively), E. combiner network responsive to said first and second modulated signals and including means for generating first and second vector signals, said first vector signal ($V_1$) being representative of the sum of said first cosine 2N modulated signal and said second sine 2N modulated signal and said second vector signal ($V_2$) being representative of the difference of said second 2N cosine modulated signal and said first sine 2N modulated signal, F. weighting means for weighting said first and second vector signals by a factor proportional to $C-w_s^2D$, where C and D are predetermined constants G. first torquer responsive to said weighted first vector signal ($T_1$) and including means for applying a torque to said rotor about said first axis, and H. second torquer responsive to said weighted second vector signal ($T_2$) and including means for applying a torque to said rotor about said second axis.

* * * * *